Figure 1:
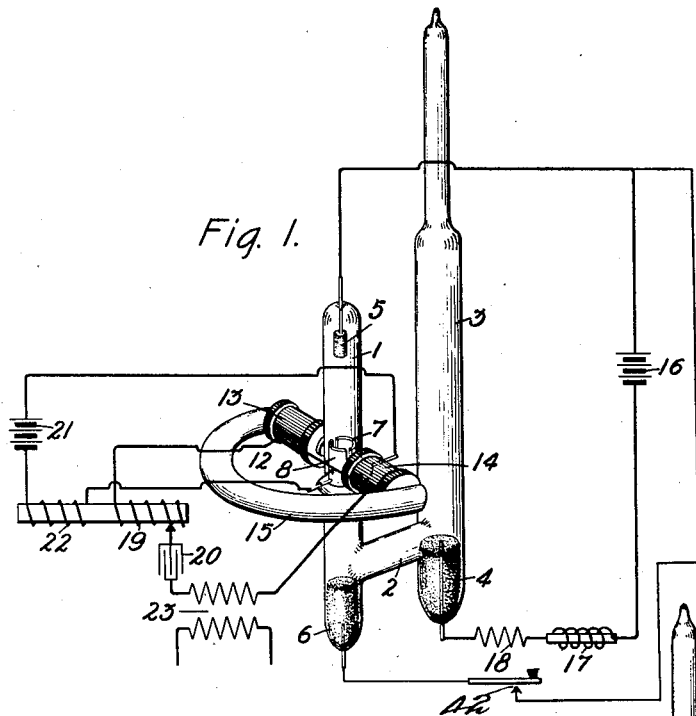

H. DE F. ARNOLD.
ALTERNATING CURRENT GENERATOR.
APPLICATION FILED JUNE 12, 1913.

1,118,174.

Patented Nov. 24, 1914
2 SHEETS—SHEET 1.

Witnesses:

Inventor:
Harold D. Arnold.
by John G. Roberts
Att'y.

H. DE F. ARNOLD.
ALTERNATING CURRENT GENERATOR.
APPLICATION FILED JUNE 12, 1913.

1,118,174.

Patented Nov. 24, 1914.
2 SHEETS—SHEET 2.

Witnesses:

Inventor:
Harold D. Arnold.
by John G. Roberts
Att'y.

UNITED STATES PATENT OFFICE.

HAROLD DE FOREST ARNOLD, OF EAST ORANGE, NEW JERSEY, ASSIGNOR TO WESTERN ELECTRIC COMPANY, OF NEW YORK, N. Y., A CORPORATION OF ILLINOIS.

ALTERNATING-CURRENT GENERATOR.

1,118,174.  Specification of Letters Patent.  Patented Nov. 24, 1914.

Application filed June 12, 1913. Serial No. 773,269.

*To all whom it may concern:*

Be it known that I, HAROLD DE FOREST ARNOLD, a citizen of the United States, residing at East Orange, in the county of Essex and State of New Jersey, have invented a certain new and useful Improvement in Alternating-Current Generators, of which the following is a full, clear, concise, and exact description.

This invention relates to a device for generating undamped high frequency electrical alternations or oscillations. Where oscillations of this character are desired, it is usual to utilize the free oscillations which may occur in a circuit containing capacity and inductance. In a circuit of this character, containing the usual condenser and inductance coil, oscillations may be generated by charging the condenser and then introducing some unstable condition in the circuit, such for instance as a discharge across a spark gap, which starts oscillations of a frequency determined by the natural frequency of the circuit, which oscillations gradually decrease in amplitude as the energy of the condenser charge is dissipated.

For many purposes, such as in wireless telegraphy and telephony, it is desirable to employ a source or generator of high frequency oscillations which will produce sustained and undamped oscillations.

It is an object of this invention to produce such a generator. With this object in view, in addition to the usual oscillatory circuit containing capacity and inductance, an auxiliary circuit is employed, the object of the auxiliary circuit being to supply energy to the oscillatory circuit and thus prevent the damping of the oscillations. These two circuits may be connected in multiple, or they may be inductively connected. In order that the energy may be supplied to the oscillatory circuit in the proper increments and at proper intervals, a part of the auxiliary circuit consists of a field of ionized vapor which is acted upon magnetically by the oscillations in the oscillatory circuit. Preferably the field of ionized vapor is produced by an arc discharge in an evacuated tube containing mercury vapor, such arc discharge being maintained by a circuit through the gaseous medium produced thereby independent of both the oscillatory and auxiliary circuits above referred to. It is obvious that any suitable source of ionization could be used instead of the mercury arc, as the means for producing such ionization is entirely independent of the rest of the apparatus.

The invention will be more fully understood by reference to the accompanying drawings wherein—

Figure 2:
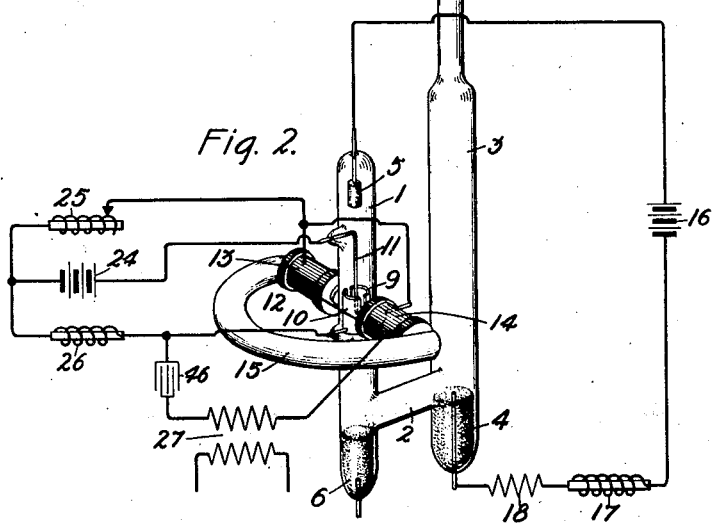
Figure 3:
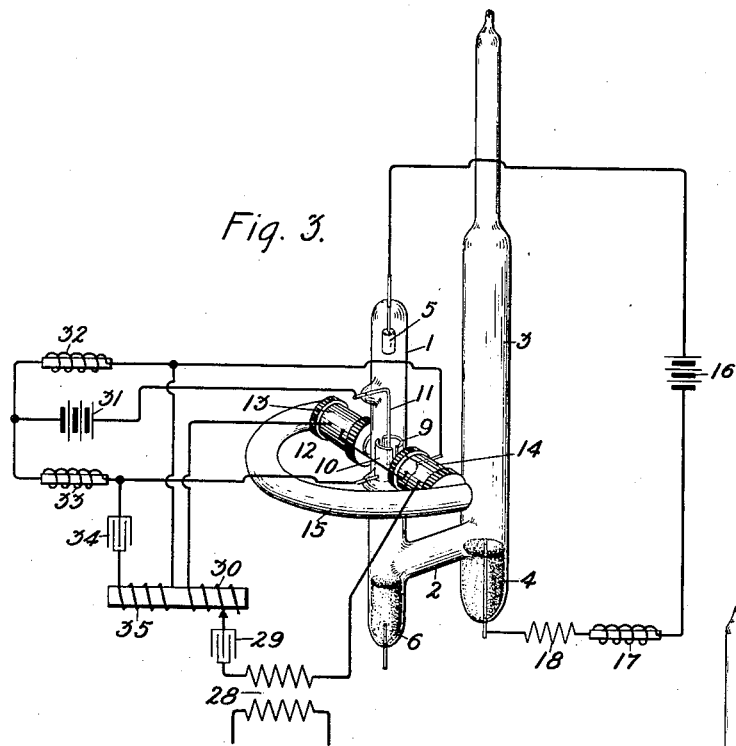
Figure 4:
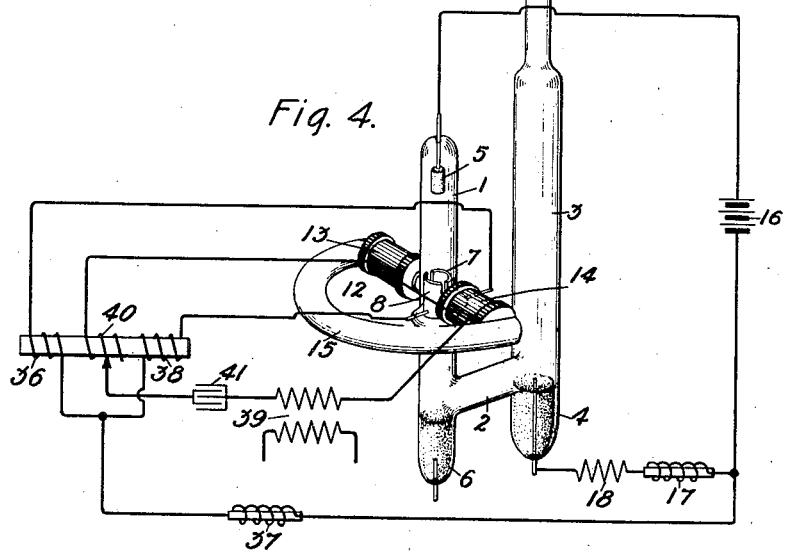

Figure 1 is a view showing the apparatus and circuits comprising one form of the alternating current generator of the invention. Figs. 2 to 4 are views showing modifications of the apparatus and circuits of Fig. 1.

Referring to the drawings, in the particular embodiment of the invention illustrated, a mercury arc device is employed for the purpose of producing a field of ionized vapor. This device comprises an evacuated glass receptacle having a main chamber 1 with a horizontal branch 2, and a condensing chamber 3, together with a mercury cathode 4, an anode 5 of carbon or other suitable material, and a starting mercury anode 6. Supported within the main chamber 1 in the form of the device shown in Figs. 1 and 4, are a pair of auxiliary electrodes 7 and 8, which are shown semi-cylindrical in form and slightly separated from each other and from the walls of the chamber.

In the form of the device shown in Figs. 2 and 3, three auxiliary electrodes 9, 10 and 11 are supported in the main chamber 1. Two of these electrodes 9 and 10, are similar in construction to electrodes 7 and 8 hereinbefore described. The third electrode 11 extends from the wall of the chamber 1 downwardly between the electrodes 9 and 10. Embracing the main chamber 1 adjacent the auxiliary electrodes, is an electromagnet 12, the means of support of which is not shown. Such magnet comprises a pair of coils 13, 14 surrounding inwardly extending pole pieces, the outer ends of which are joined by a yoke piece 15. The pole pieces are so arranged that the magnetic lines of force between them are in a direction transverse to the flow of the ionized stream in the chamber 1. The magnet construction is the same in all four figures and serves to alter the distribution of ionization between electrodes 7 and 8 or 9 and 10 as the case may be. Also in all four forms of the invention a maintaining circuit for the mercury arc or ionized stream is provided. This circuit comprises a battery 16, the positive pole of which is connected to the anode 5, and the negative pole of which is connected to the mercury cathode 4 through a balancing or steadying impedance comprising an inductance 17 and resistance 18. An auxiliary starting circuit, including a starting key 42 is provided. The mercury arc circuit, when once established, as by tipping the tube, closing the circuit at the starting key 42 over the path 16, 17, 18, 4, 2, 1, 6, 42, 16 and then releasing the key 42, is maintained automatically over the path 16, 17, 18, 4, 2, 1, 5, 16, which includes the ionized stream in the main chamber 1.

Referring to the form of the invention shown in Fig. 1, the oscillatory circuit comprises the magnet coils 13 and 14, an adjustable inductance coil 19 and a condenser 20. As this circuit contains both inductance and capacity, it fulfils the conditions necessary for the production of high frequency oscillations, and by making the inductance 19 or the condenser 20 adjustable, the natural period of the circuit and hence the frequency of the oscillations may be varied. The auxiliary circuit comprises the battery 21, the inductance coil 22, which is wound on the same core as the coil 19, and in connection with such coil serves to inductively connect the oscillatory and auxiliary circuits, the electrodes 7 and 8, and the ionized vapor therebetween. By means of the transformer 23 in the oscillatory circuit, the oscillations produced therein may be utilized in a supply circuit for wireless telegraph or telephone or other apparatus. When the generator is in operation, an arc is maintained between the anode 5 and the cathode 4. This arc is maintained constant and the intensity thereof is independent of either the oscillatory or auxiliary circuits. The arc above referred to provides a field of ionized vapor between the electrodes 7 and 8, which field is acted upon by the electromagnet 12 in the oscillatory circuit. When the oscillations are started in the oscillatory circuit, as, for instance, by discharging the condenser 20, such oscillations, passing through the coils 13 and 14, act upon the field of ionized vapor between the electrodes 7 and 8, serving to vary the distribution of the ionization between such electrodes. In the arrangement shown in Fig. 1, one of the electrodes which is connected to the negative battery acts as a cathode. It has been found by experiment that when the arc is deflected by the magnet toward the cathode, there is an increase in the current in the auxiliary circuit, and a deflection in the other direction causes a corresponding decrease in the current in such circuit. Thus pulsations in the auxiliary circuit are caused by the oscillations in the oscillatory circuit. As these two circuits are inductively connected, it has been found that, substantially, at the time when a pulsation is approaching its maximum value, the corresponding oscillation is approaching its maximum positive value, and when a pulsation is approaching its minimum value, the corresponding oscillation is approaching its maximum negative value so that in either case the impulse tends to sustain the oscillation and prevents the damping thereof.

In the modified arrangement shown in Fig. 2, the electrode 11 is connected to the positive side of the battery 24 and hence acts as an anode. The electrodes 9 and 10 are connected to the negative side of the battery through retardation coils 25 and 26. In this case the auxiliary circuit has two branches, both of which include a portion of a field of ionized vapor. The oscillatory circuit, which comprises the condenser 46, the primary coil of the transformer 27 and the magnet coils 13 and 14, is bridged across the negative electrodes or cathodes 9 and 10. When the arc is deflected toward one of the cathodes it is deflected away from the other cathode, which results in an increase in the current in one branch of the auxiliary circuit, and a corresponding diminution in the other branch. The oscillatory circuit being connected across the two branches of the auxiliary circuit, the sum of the variations in such branch circuits is impressed upon the oscillatory circuit. The operation of the generator shown in Fig. 2 is similar to that of the generator of Fig. 1 with the exception that, owing to the divided circuit arrangement of the auxiliary circuit, double the effect of the auxiliary circuit upon the oscillatory circuit is obtained.

The generator shown in Fig. 3 is like that shown in Fig. 2 with the exception that the auxiliary circuit, instead of being connected directly across the electrodes 9 and 10, is inductively connected in substantially the same relation by means of a transformer. Referring to Fig. 3, the oscillatory circuit comprises the magnet coils 13 and 14, the primary coil of the transformer 28, the condenser 29 and the adjustable inductance coil 30. The anode 11 is connected to the positive pole of the battery 31 and the cathodes 9 and 10 to the negative pole through the retardation coils 32 and 33, respectively. Bridged across the cathodes 9 and 10 is a circuit including the condenser 34 and the inductance coil 35. By means of the coils 30 and 35, which are wound on the same core, the auxiliary and oscillatory circuits are inductively connected.

In the form of generator shown in Fig. 4, a circuit arrangement is used in which only one battery is employed. In this form the main anode 5 acts both as the anode for the main arc stream, and as the anode for the auxiliary circuit. The auxiliary circuit has two branches which may be traced as follows: From positive battery 16, anode 5, cathode 7, inductance coil 36, retardation coil 37 to negative battery, and from positive battery 16, anode 5, cathode 8, inductance coil 38, retardation coil 37 to negative battery. The oscillatory circuit comprises the magnets 13 and 14, the primary coil of the transformer 39, condenser 41 and the adjustable inductance coil 40. As the coils 36, 38 and 40 are wound on the same core, such coils provide an inductive connection between the auxiliary and the oscillatory circuits. The operation of this form of generator is essentially the same as that of the generator of Fig. 2 hereinbefore described.

I claim:

1. In an alternating current generator, means for maintaining a conducting path of ionized vapor, an oscillatory circuit, an auxiliary circuit coöperating therewith and including auxiliary electrodes immersed in said ionized vapor, and means for varying the conductivity between said auxiliary electrodes, such variations acting to add increments of energy to said oscillatory circuit.

2. In an alternating current generator, an oscillatory circuit, means for maintaining a field of ionized vapor, an auxiliary circuit including a source of energy and a non-arcing current path through said vapor and means for varying the conductivity of said current path, and by virtue of such variations adding increments of electrical energy to the oscillatory circuit.

3. In an alternating current generator, a vapor electric device, means for maintaining an ionized arc stream therein, an oscillatory circuit, an auxiliary circuit coöperating therewith and comprising electrodes immersed in said arc stream, and means included in said oscillatory circuit adjacent said electrodes for varying the electrical conductivity between said electrodes, whereby sustained electrical oscillations are produced in said oscillatory circuit.

4. In an alternating current generator, means for maintaining a field of ionized vapor, an oscillatory circuit, an auxiliary circuit coöperating therewith, comprising a source of energy and a current path through said ionized vapor and means included in said oscillatory circuit and responsive to the oscillations therein for varying the conductivity of said ionized vapor, thereby producing energy pulsations in the auxiliary circuit, said pulsations acting to reinforce the oscillations in the oscillatory circuit.

5. In an alternating current generator, an evacuated receptacle, means for maintaining a field of ionized vapor therein, an oscillatory circuit, an auxiliary circuit comprising a source of energy and electrodes immersed in said ionized vapor, means responsive to oscillations in said oscillatory circuit acting upon the ionized vapor for producing energy pulsations in the said auxiliary circuit, said pulsations acting to reinforce the oscillations in the oscillatory circuit.

In witness whereof, I hereunto subscribe my name this tenth day of June A. D., 1913.

HAROLD DE FOREST ARNOLD.

Witnesses:
JAMES W. FARRELL,
MURRAY V. CONATY.